US009532594B2

(12) United States Patent
Coleman, Sr. et al.

(10) Patent No.: US 9,532,594 B2
(45) Date of Patent: Jan. 3, 2017

(54) LABEL APPLYING METHOD AND ASSOCIATED RECEPTACLE

(71) Applicant: R.J. Reynolds Tobacco Company, Winston-Salem, NC (US)

(72) Inventors: Benjamin Floyd Coleman, Sr., Winston-Salem, NC (US); Robert Eugene Weaver, High Point, NC (US); Victor Lee Hardy, Clemmons, NC (US)

(73) Assignee: R.J. REYNOLDS TOBACCO COMPANY, Winston-Salem, NC (US)

( * ) Notice: Subject to any disclaimer, the term of this patent is extended or adjusted under 35 U.S.C. 154(b) by 123 days.

(21) Appl. No.: 14/305,452

(22) Filed: Jun. 16, 2014

(65) Prior Publication Data

US 2014/0290672 A1 Oct. 2, 2014

Related U.S. Application Data

(62) Division of application No. 13/529,755, filed on Jun. 21, 2012, now Pat. No. 8,783,320.

(51) Int. Cl.
*A24C 5/60* (2006.01)
*B65C 9/06* (2006.01)
(Continued)

(52) U.S. Cl.
CPC ................. *A24C 5/601* (2013.01); *B65C 9/06* (2013.01); *B65C 9/1884* (2013.01); *B65C 9/36* (2013.01);
(Continued)

(58) Field of Classification Search
CPC ................. Y10S 220/00; Y10T 156/10; Y10T 156/1707; Y10T 156/1712; A24C 5/60; A24C 5/601; B65C 9/06; B65C 9/26;B32B 2439/00; B32B 2309/06; B32B 37/0046; B32B 2439/02
See application file for complete search history.

(56) References Cited

U.S. PATENT DOCUMENTS 1,574,837 A * 3/1926 Maserang ............... F24B 15/04 217/125
1,763,907 A * 6/1930 Sommers .................. B65F 1/08 220/255

(Continued)

OTHER PUBLICATIONS

Label-Aire® 3114 Tampa-Blow Primary Applicator Information/ Specifications Brochure; http://www.label-aire.com/files/51.pdf; site visited Aug. 15, 2012.

(Continued)

*Primary Examiner* — Linda L Gray
(74) *Attorney, Agent, or Firm* — Womble Carlyle Sandridge & Rice LLP

(57) ABSTRACT

A label applying apparatus and a related method are provided. The label applying apparatus may include a label applicator and a receptacle. The label applicator may include a displaceable piston with an applicator surface configured to receive a label. The receptacle may include walls that define an interior compartment. Further the receptacle may include a pivotable cover member that pivots about a hinge between a closed position that covers an upper opening of the receptacle and an open position in which articles of material may be inserted into the interior compartment. The distal end of an upper portion of the pivotable cover member may engage the articles such that the articles are retained in a position whereby the displaceable piston extends into the interior compartment and applies a label to a label application surface of the most proximate one of the articles to the applicator surface of the displaceable piston.

17 Claims, 10 Drawing Sheets

(51) Int. Cl.

| | |
|---|---|
| ***B65C 9/26*** | (2006.01) |
| ***B32B 37/00*** | (2006.01) |
| ***B65C 9/18*** | (2006.01) |
| ***B65C 9/36*** | (2006.01) |

(52) U.S. Cl.

CPC ............. *Y10T 156/10* (2015.01); *Y10T 156/17* (2015.01); *Y10T 156/1707* (2015.01); *Y10T 156/1712* (2015.01)

(56) References Cited

U.S. PATENT DOCUMENTS

| | | | | |
|---|---|---|---|---|
| 2,264,339 | A | 12/1941 | Sherman | |
| 2,267,195 | A | 12/1941 | Elliott | |
| 2,302,261 | A | 11/1942 | Ryan | |
| 2,349,063 | A | 5/1944 | Von Hofe | |
| 2007/0289967 | A1 * | 12/2007 | Pierce ..................... | B65F 1/004 220/212 |
| 2008/0135557 | A1 * | 6/2008 | Williams .............. | B65F 1/1468 220/288 |
| 2013/0340914 | A1 | 12/2013 | Coleman, Sr. et al. | |

OTHER PUBLICATIONS

Label-Aire® 3115/14 Tamp-Blow RFID Primary Applicator Information Brochure; http//www.label-aire.com/files/161.pdf; site visited Aug. 15, 2012.

* cited by examiner

LABEL APPLYING METHOD AND ASSOCIATED RECEPTACLE

CROSS-REFERENCE TO RELATED APPLICATIONS

This application is a divisional of U.S. patent application Ser. No. 13/529,755, filed Jun. 21, 2012, which is incorporated herein by reference in its entirety.

BACKGROUND OF THE DISCLOSURE

Field of the Disclosure

The present disclosure relates to application of labels to products including, made from, or derived from tobacco, or that otherwise incorporate tobacco, and are intended for human consumption, and more particularly, to apparatuses and methods for applying labels to such products.

Description of Related Art

Labels are often employed for a variety of purposes. For example, labels may be applied to products during or after the manufacture or packaging thereof such that manufacturers or distributors may identify and/or track the products. Labels may additionally or alternatively be applied by merchants prior to sale of the products. Accordingly, labels may be applied to products and related packaging at a variety of points in time during the product manufacturing, distribution, and sale cycles.

Some existing methods for applying labels rely on manual application thereof, by hand, to the products or packaging containing the products. For example, in the manufacture of cigarettes, a conventional type of tray for carrying filter elements, as-formed cigarettes, or the like, may include a polymeric body having a removable sidewall, and the removable sidewall may be constructed of cardboard. Each tray may have a tray-identifying label mounted to the polymeric body. In addition, the removable sidewall, conventionally referred to as a sword, may have an appropriate filter- or cigarette-identifying label mounted thereto, for identifying the filter elements or cigarettes in the tray including that sword as the removable sidewall. The filter elements/cigarettes may be stacked in such trays and held in place by respective swords. The trays may then be transported to alternate locations for inspection and/or further processing.

In order to track the identity of each tray of filter elements/cigarettes through subsequent processing steps, appropriately coded labels may be applied to the tray and/or the sword. In instances where such a label is applied to each sword, a worker may individually apply labels to the swords in a manual process. Since this process may include alignment of the label, in addition to application of the label to the sword, this process can be tedious and/or time consuming work. Further, since the labels may need to be placed in the proper location and/or in the proper orientation with respect to the sword for the labels to be appropriately read by automated label reading equipment, there may be other issues and/or drawbacks associated with the manual application of labels to products or packaging, for example, in a filter element and/or cigarette manufacturing process. Thus, there exists a need for an apparatus and method for applying such labels to sword portions of filter element/cigarette trays implementing such swords.

BRIEF SUMMARY OF THE DISCLOSURE

The above and other needs are met by various aspects of the present disclosure, wherein, in one aspect, a label applying apparatus is provided. The label applying apparatus may comprise a label applicator comprising a displaceable piston defining an applicator surface configured to receive a label from a substantially continuous supply of labels, the piston, having the label on the applicator surface thereof, being displaceable in an application direction. The label applying apparatus may further comprise a receptacle defining an opening configured to receive at least one article defining a label application surface therethrough such that the at least one article extends from the opening. The receptacle may include an end wall configured to support the at least one article such that the label application surface thereof is substantially parallel with the end wall and the applicator surface of the displaceable piston, upon the displaceable piston extending in the application direction into the receptacle to apply the label to the label application surface. Further, the receptacle may include a bottom wall and at least one sidewall configured to cooperate to support the at least one article such that the label application surface is disposed at a selected position with respect to the applicator surface of the displaceable piston. Additionally, the receptacle may include a pivotable cover member opposed to the bottom wall and configured to be pivotable toward and away from the end wall, the pivotable cover member having a distal end configured to engage the at least one article extending from the receptacle through the opening, so as to urge the at least one article against the end wall, when pivoted toward the end wall.

In some embodiments the distal end of the pivotable cover member may be rounded. For example, the pivotable cover member may comprise a U-shaped member defining a channel configured to receive the distal end of the pivotable cover member. The at least one sidewall may comprise opposing first and second sidewalls. Further, the pivotable cover member may comprise an upper portion extending from a hinge to the distal end and a pair of opposing side portions coupled to the upper portion and configured to extend proximate the opposing first and second sidewalls. The opposing side portions of the pivotable cover member may be configured to extend outside of the opposing first and second sidewalls.

In some embodiments the pivotable cover member may further comprise a handle configured to facilitate pivoting the pivotable cover member and further configured to engage a recess defined by the at least one article after labeling thereof and removal from the receptacle. At least one of the bottom wall and the at least one sidewall may be adjustable so as to adjust the selected position on the label application surface at which the applicator surface of the displaceable piston applies the label. The label applying apparatus may further comprise a bracket configured to provide for adjustment of the selected position. The end wall may extend past the at least one sidewall such that the at least one article is accessible outside of the receptacle when the pivotable cover member is pivoted toward the end wall. The receptacle may further comprise an end opening positioned opposite to the end wall and configured to receive the displaceable piston of the label applicator. Additionally, the receptacle may further comprise a connector section extending from the end opening and configured to at least partially surround the displaceable piston.

In another aspect a receptacle for use in applying labels is provided. The receptacle may comprise an end wall configured to support at least one article defining a label application surface substantially parallel therewith. Further, the receptacle may include a bottom wall and at least one sidewall configured to cooperate to support the at least one article such that the label application surface thereof is disposed at a selected position (e.g., laterally) with respect to the applicator surface of the displaceable piston. The end wall, the bottom wall and the sidewall may collectively define an opening configured to receive the at least one article therethrough such that the at least one article extends from the opening. The receptacle may additionally include a pivotable cover member opposed to the bottom wall and configured to be pivotable toward and away from the end wall, the pivotable cover member having a distal end configured to engage the at least one article extending from the receptacle through the opening, so as to urge the at least one article against the end wall, when pivoted toward the end wall.

In some embodiment of the receptacle, the distal end of the pivotable cover member may be rounded. For example, the pivotable cover member may comprise a U-shaped member defining a channel configured to receive the distal end of the pivotable cover member. The pivotable cover member may further comprise a handle configured to facilitate pivoting the pivotable cover member and further configured to engage the at least one article after labeling thereof and removal from the receptacle, for example, such that one or more labeled articles may be removed from the receptacle, one or more at a time, and temporarily supported by an operator on the handle until a particular number of labeled articles is removed by the operator for subsequent handling. The end wall may extend outwardly of the opening and past the at least one sidewall such that the at least one article is supported by the end wall and is accessible outside of the receptacle when the pivotable cover member is pivoted toward the end wall.

In some embodiments of the receptacle, the at least one sidewall may comprise opposing first and second sidewalls. The pivotable cover member may comprise an upper portion extending from a hinge to the distal end and a pair of opposing side portions coupled to the upper portion and configured to extend proximate the opposing first and second sidewalls. The opposing side portions of the pivotable cover member may be configured to extend outside of the opposing first and second sidewalls. The receptacle may further comprise an end opening positioned opposite to the end wall. A connector section may extend from the end opening to engage a label applicator such that a displaceable piston thereof is capable of extending through the end opening.

In an additional aspect, a method for labeling is provided. The method for labeling may comprise receiving a label from a substantially continuous supply of labels on an applicator surface of a displaceable piston, the displaceable piston, having the label on the applicator surface thereof, being displaceable in an application direction. The method may also include receiving at least one article defining a label application surface through an opening in a receptacle, such that the at least one article extends from the opening. Further, the method may comprise supporting the at least one article with an end wall of the receptacle such that the label application surface thereof is substantially parallel with the applicator surface of the displaceable piston. The method may additionally include supporting the at least one article with a bottom wall of the receptacle, in cooperation with at least one side wall of the receptacle, such that the label application surface of the at least one article is disposed at a selected position (e.g., laterally) with respect to the applicator surface of the displaceable piston. The method may further comprise engaging the at least one article extending from the receptacle, through the opening, with a distal end of a pivotable cover member opposed to the bottom wall and configured to be pivotable toward and away from the end wall, the distal end of the pivotable cover member being configured to urge the at least one article against the end wall, when the pivotable cover member is pivoted toward the end wall. Also, the method may include extending the displaceable piston into the receptacle along the application direction so as to engage the label application surface of the at least one article with the applicator surface of the displaceable piston so as to apply the label to the label application surface of the at least one article.

In some embodiments the method may further comprise lifting the at least one article to which the label is applied from the receptacle such that the distal end of the pivotable cover member applies pressure to the label. The method may additionally include engaging the at least one article that is removed from the receptacle with a handle coupled to the pivotable cover member, for example, such that one or more labeled articles removed from the receptacle, one or more at a time, can be temporarily supported by an operator on the handle until a particular number of labeled articles is removed by the operator for subsequent handling.

Aspects of the present disclosure thus address the identified needs and provide other advantages as otherwise detailed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1 illustrates a perspective view of a label applying apparatus comprising a label applicator and a receptacle according to an example embodiment of the present disclosure;

FIG. 2 schematically illustrates a route for a substantially continuous supply of labels through the label applicator of FIG. 1 according to an example embodiment of the present disclosure;

DETAILED DESCRIPTION OF THE DISCLOSURE

The present disclosure now will be described more fully hereinafter with reference to the accompanying drawings, in which some, but not all aspects of the disclosure are shown. Indeed, the disclosure can be embodied in many different forms and should not be construed as limited to the aspects set forth herein; rather, these aspects are provided so that this disclosure will satisfy applicable legal requirements. Like numbers refer to like elements throughout.

Figure 1:
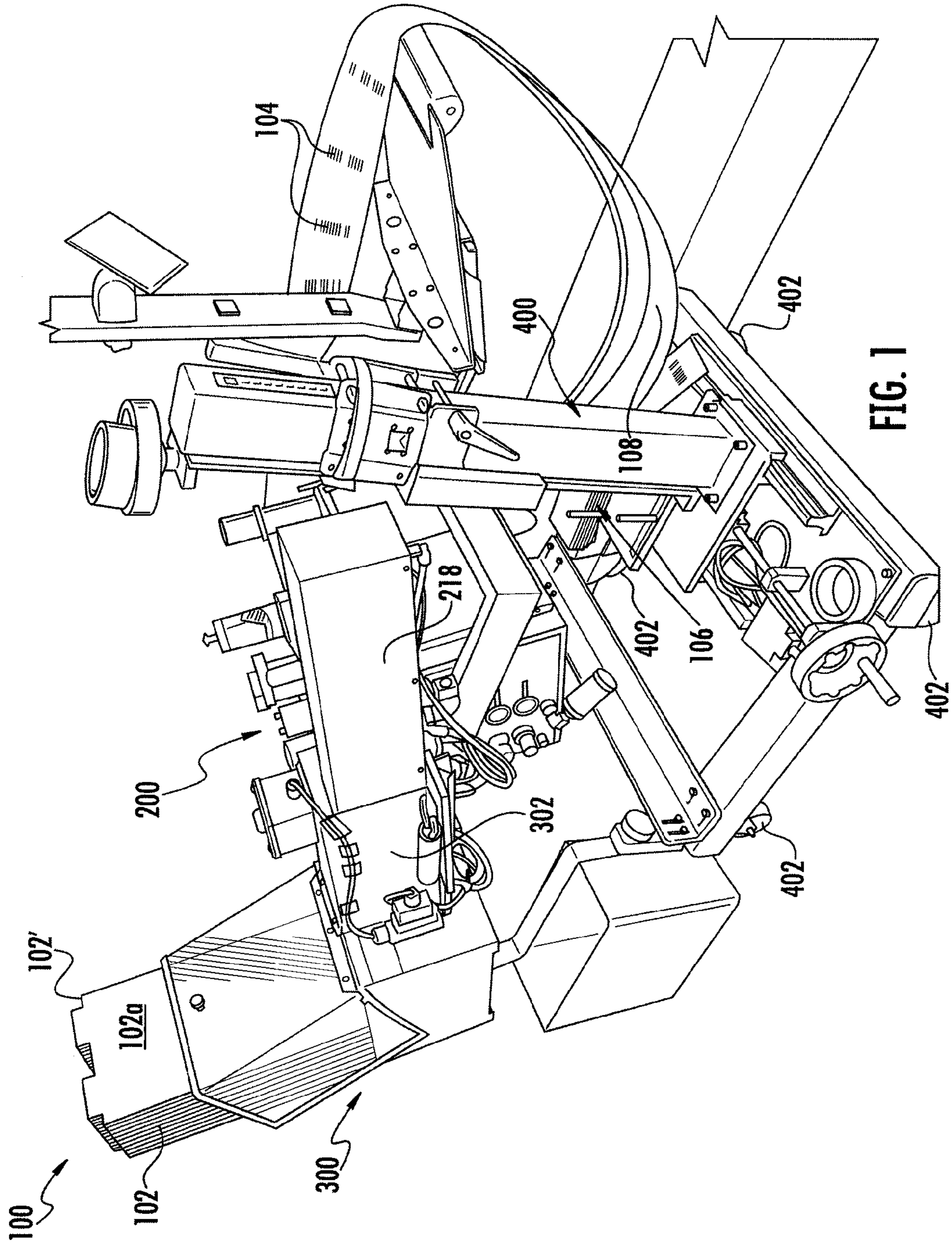

As described herein, embodiments of the disclosure relate to apparatuses and methods configured for applying labels to packaging, products, or other materials or items. In this regard, FIG. 1 illustrates a label applying apparatus 100 according to an example embodiment of the present disclosure. The label applying apparatus 100 may include a label applicator 200 and a receptacle 300. The label applying apparatus 100 may be mounted to a stand 400, which may include wheels or casters 402 that allow the label applying apparatus to be transported to a desired location for use. In some embodiments the label applicator 200 may comprise a labeling system sold by LABEL-AIRE of Fullerton, Calif. In this regard, other components of the label applying apparatus 100 may be combined with an existing embodiment of a label applicator to perform the functions described herein.

The operation of the label applying apparatus 100 will be described in detail below. Briefly, however, the receptacle 300 functions to hold one or more articles 102 in a desired position relative to the label applicator 200. The label applicator 200 may thereby apply a label 104 to a label application surface 102*a* of one of the articles 102 at a selected position thereon.

The term "article," as used herein, refers to any panel or sheet of material, blank, or other object. Further, the article 102 may comprise one or more of a variety of materials including paper, paperboard, cardboard, plastic, etc. In this regard, the term "article" is not intended to be limiting. However, by way of example, the articles 102 illustrated herein are cardboard blanks that may be formed into sidewalls or "swords" for trays, as described below.

Further, the term "label," as used herein may refer to any item configured for attachment to another item. For example the label 104 may comprise a panel of paper or other material with adhesive coupled to one surface thereof. The label 104 may include indicia such as a barcode or other identifier or indicia, in some embodiments. The labels 104 may be supplied from a substantially continuous supply of labels 106. The substantially continuous supply of labels 106 may comprise folded sheets or a roll of a backing or substrate 108 such as waxed paper to which the labels 104 are attached.

Figure 2:
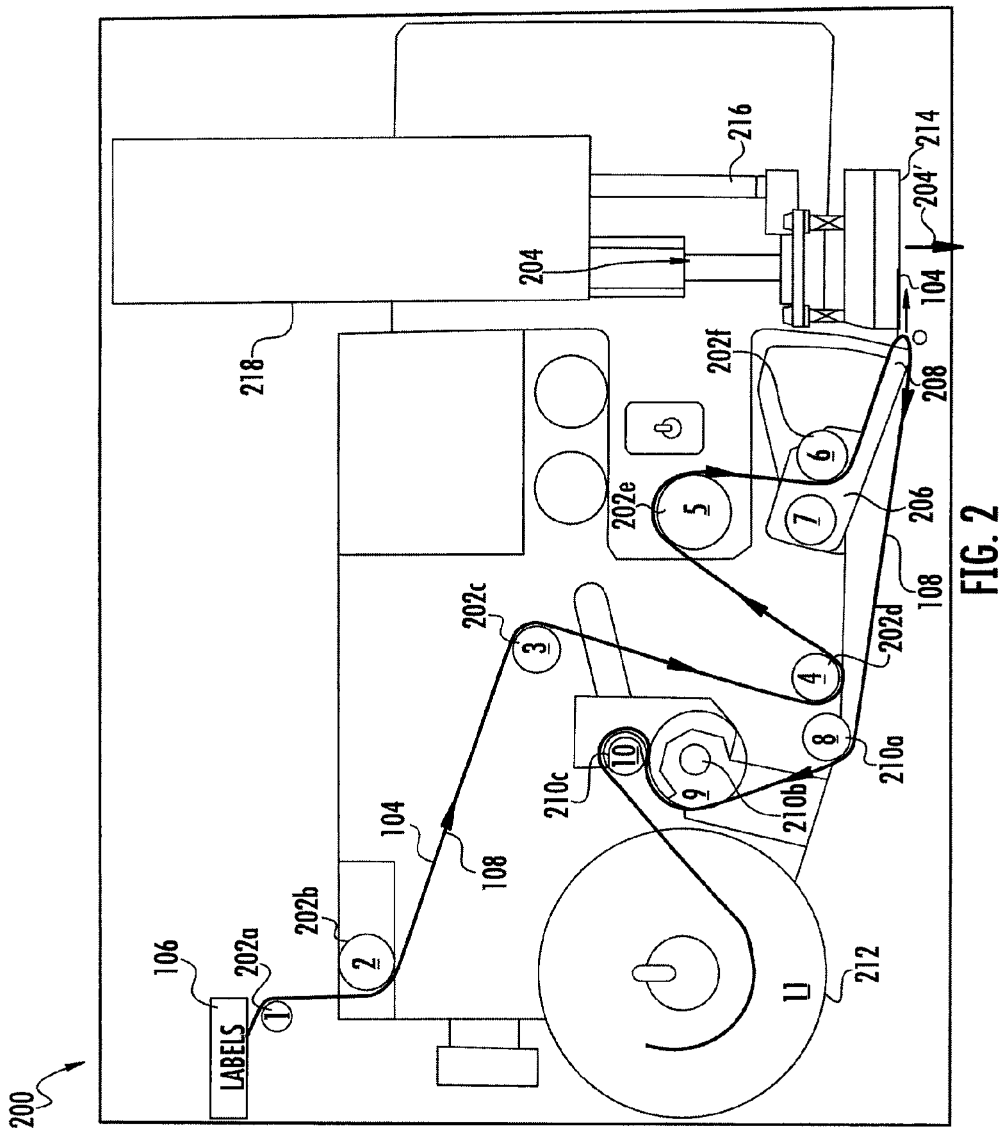

As schematically illustrated in FIG. 2, in some embodiments the label applicator 200 may comprises a series of supply rollers 202*a-f* (collectively, "202") configured to direct the substantially continuous supply of labels 106 along a desired path. In particular, the supply rollers 202 may be configured to direct the substantially continuous supply of labels 106 to an applicator surface 214 of a displaceable piston 204. The displaceable piston 204 is configured to apply labels 104 to the articles 102. In this regard, the substantially continuous supply of labels 106 may be directed into contact with a separator member 206 that extends to a tip 208. As the substantially continuous supply of labels 106 reaches the tip 208 of the separator member 206, the sharp change in direction of the path of travel may cause a label 104 to separate from the substrate 108. The substrate 108 may then be directed through a plurality of return rollers 210*a-c* (collectively, "210"), prior to being collected on a spool 212.

The separator member 206 may be aligned with the displaceable piston 204 such that as a label 104 separates from the substrate 108 at the tip 208 of the separator member, the label is directed onto an applicator surface 214 defined by the displaceable piston 204. In order to retain the label 104 on the applicator surface 214, the label applicator 200 may further comprise an air connection 216. The air connection 216 may be configured to apply suction to the applicator surface 214 of the displaceable piston 204 such that the label 104 is retained thereon with the adhesive side of the label directed away from the applicator surface. The air connection 216 may also function to facilitate removal of the label 104 from the backing 108 in some embodiments.

Figure 3:
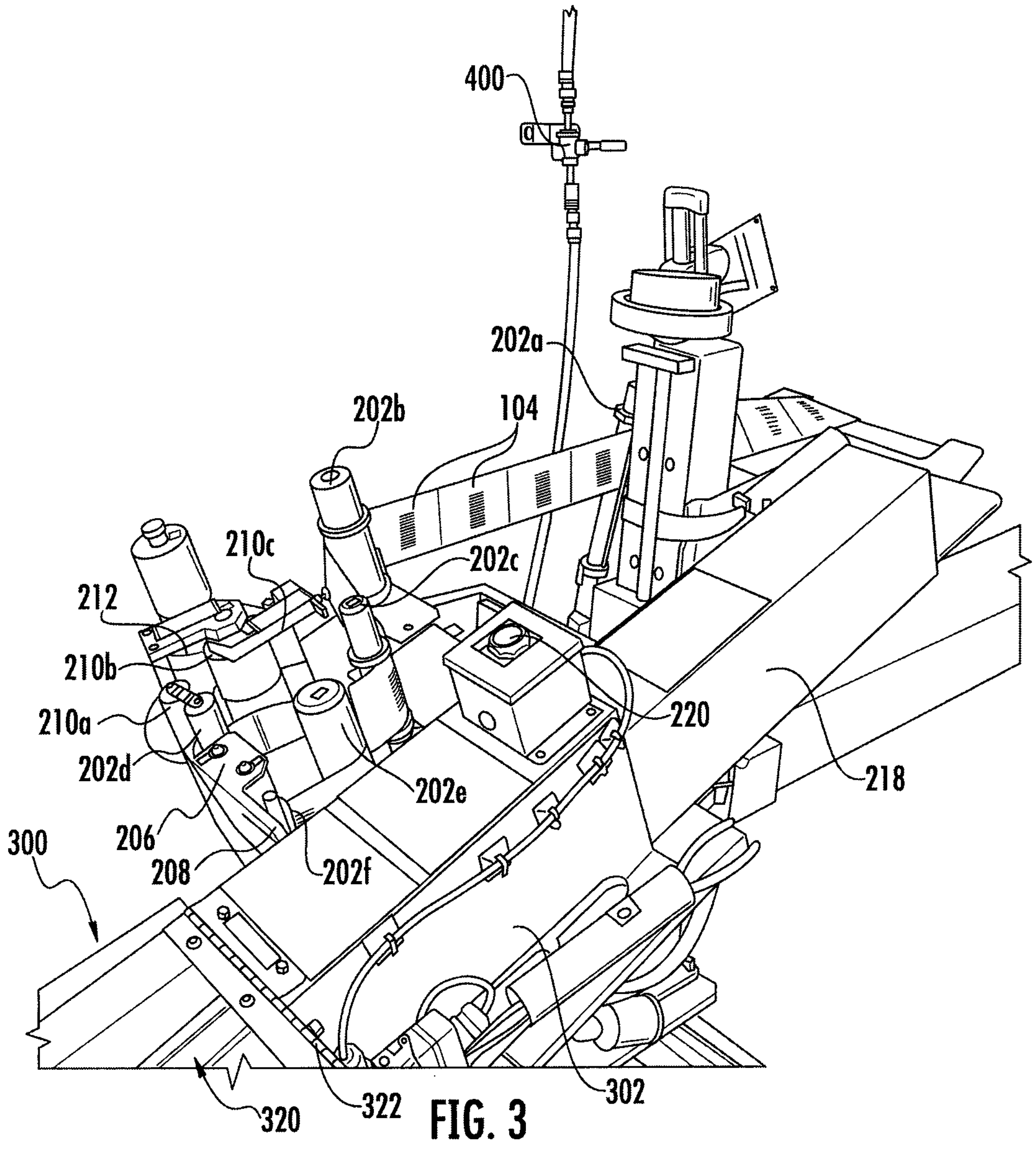
FIG. 3 illustrates a perspective view of the label applicator of FIG. 1.

As illustrated in FIG. 3, in some embodiments the air connection 216 may be connected to with an air supply 400. Pressurized air received from the air supply 400 may be converted into vacuum in the label applicator 200, for example by employing the Venturi Effect, or via other known methods and apparatuses for producing vacuum. The pressurized air may also be expelled outwardly from the applicator surface 214, at some points in time, to release the label 104 from the applicator surface 214, as will be discussed below. A regulator may be employed to control the pressure of the air directed to and/or from the applicator surface 214.

As further illustrated in FIG. 3, the label applicator 200 may comprise a housing 218. The housing 218 may cover at least a portion of the components thereof such that the possibility of user contact therewith is reduced. However, as schematically illustrated in FIG. 2, a portion of the displaceable piston 204 may extend therefrom. In order to prevent contact with the displaceable piston 204 and other components extending from the housing 218 of the label applicator 200, the receptacle 300 may comprise a connector section 302 configured to at least partially surround the displaceable piston and/or other components of the label applicator, wherein the connector section may also be configured to receive the displaceable piston into the receptacle.

Figure 4:
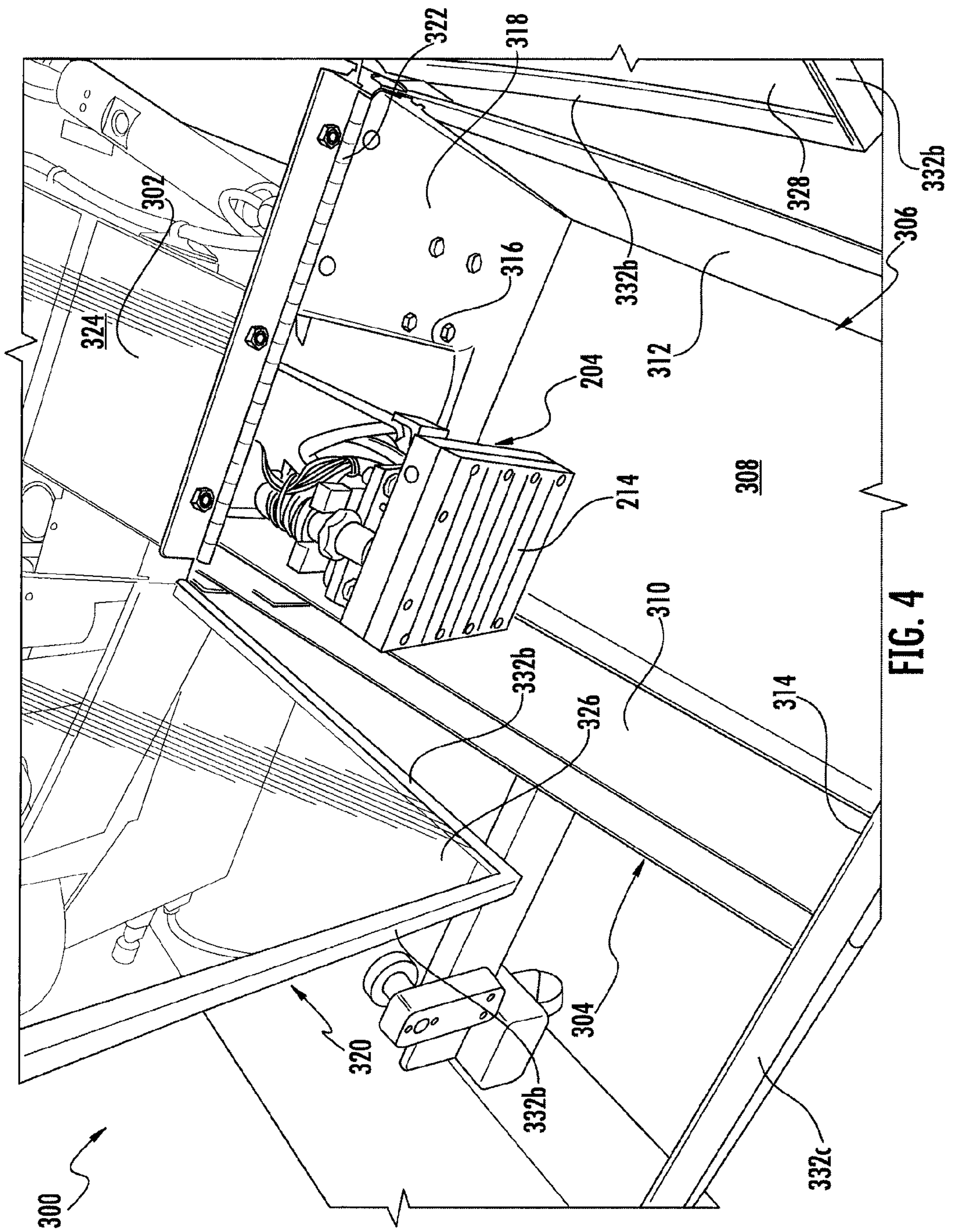
FIG. 4 illustrates a displaceable piston of the label applying apparatus of FIG. 1 defining an applicator surface and partially extending into the receptacle of FIG. 1 according to an example embodiment of the present disclosure.

Various other components of the receptacle 300 are shown in FIG. 4, which illustrates a view through an upper opening 304 of an interior compartment 306 of the receptacle 300 defined by a plurality of walls. The walls include a bottom wall 308, at least one sidewall, and an end wall 314. In the illustrated embodiment, the receptacle includes a pair of opposing sidewalls 310, 312. The end wall 314 is positioned opposite to an end opening 316, which may be defined in a second end wall 318.

The end opening 316 may be configured to receive the displaceable piston 204 of the label applicator 200. In this regard, the connector section 302 may extend from the end opening 316 away from the interior compartment 304. Accordingly, as illustrated in FIG. 4, the displaceable piston 204 may extend through the connector section 302 and the end opening 316 into the interior compartment 306 of the receptacle 300. The displaceable piston 204 is illustrated in a partially extended position in FIG. 4 for illustration purposes. During operation the displaceable piston 204 may remain in a retracted position partially or fully outside of the interior compartment 306 of the receptacle prior to extending into the interior compartment to place a label 104 on an article 102.

As illustrated in FIG. 4, the receptacle 300 may further comprise a pivotable cover member 320, which may be connected to a hinge 322 at the second end wall 318. The pivotable cover member 320 may include an upper portion 324 and opposing side portions 326, 328. The upper portion 324 and the side portions 326, 328 may comprise a transparent or translucent material such as plastic or glass in some embodiments. By forming the pivotable cover member 320 from such a material, a user may be able to view through the pivotable cover member into the interior compartment 306 to monitor operation of the displaceable piston 204. Thereby, for example, a user may know when a label 104 has been applied to an article 102.

As illustrated by reference to FIGS. 4 and 5, the pivotable cover member 320 is opposed to the bottom wall 308 of the receptacle 300 and configured to pivot toward and away from the end wall 314. The upper portion 324 of the pivotable cover member 320 extends from the hinge 322 to a distal end 326 which may terminate proximate the end wall 314 when the pivotable cover member 320 is in a closed position. Further, the side portions 326, 328 may be configured to extend proximate the opposing sidewalls 310, 312 of the receptacle 300. For example, the side portions 326, 328 of the pivotable cover member 320 may extend outside of the sidewalls 310, 312 of the receptacle 300, as illustrated. Accordingly, when the pivotable cover member 320 is in the closed configuration, the pivotable cover member may cooperate with the walls 308, 310, 312, 314, 318 to substantially completely block access to the interior compartment 306 of the receptacle 300. Thereby, issues with respect to an operator coming into contact with the displaceable piston 204 when the pivotable cover member 320 is in the closed position may be avoided. Thus, the closed position of the pivotable cover member 320 may be employed to protect operators of the label applying apparatus 100 from contact with the displaceable piston 204, and further operate to protect the displaceable piston from exposure to dust or other potential sources of damage.

Figure 5:
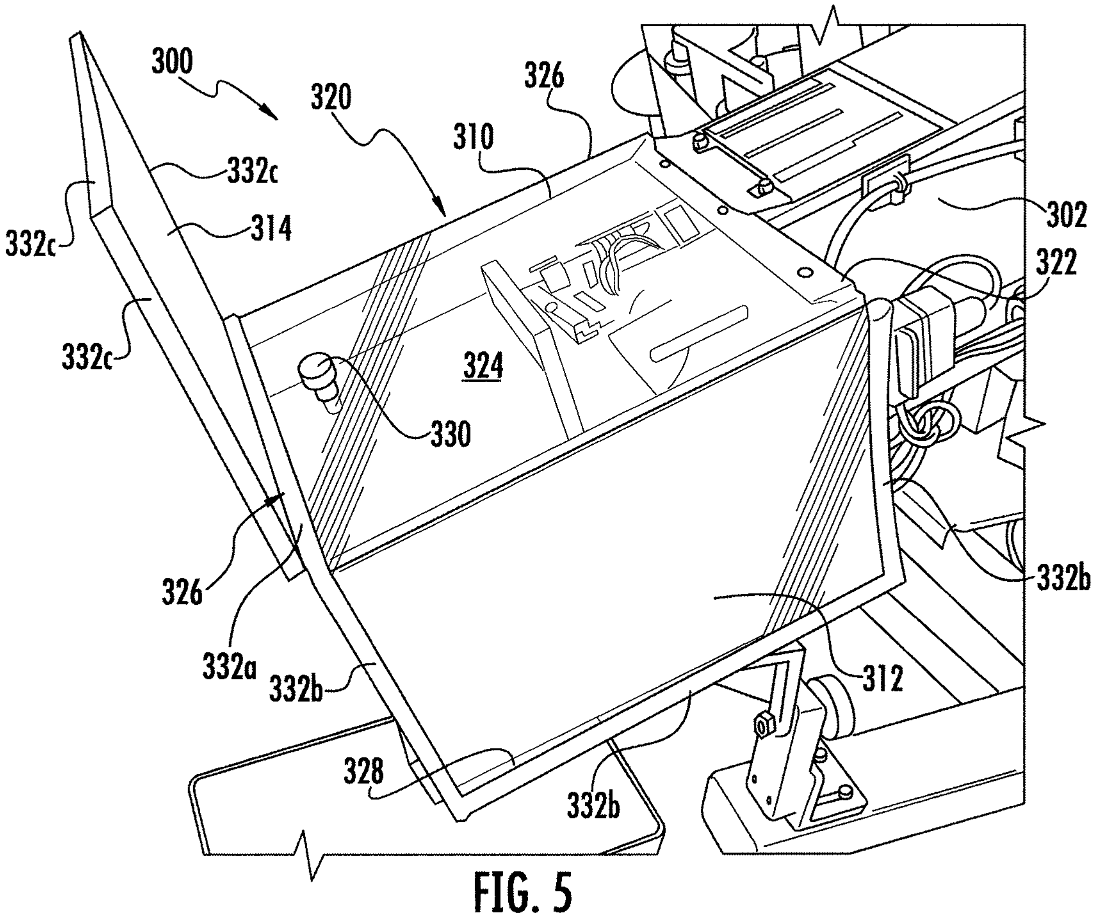
FIG. 5 illustrates a perspective view of the receptacle of FIG. 1 without any articles therein and with a pivotable cover member thereof in a closed position according to an example embodiment of the present disclosure.
Figure 6:
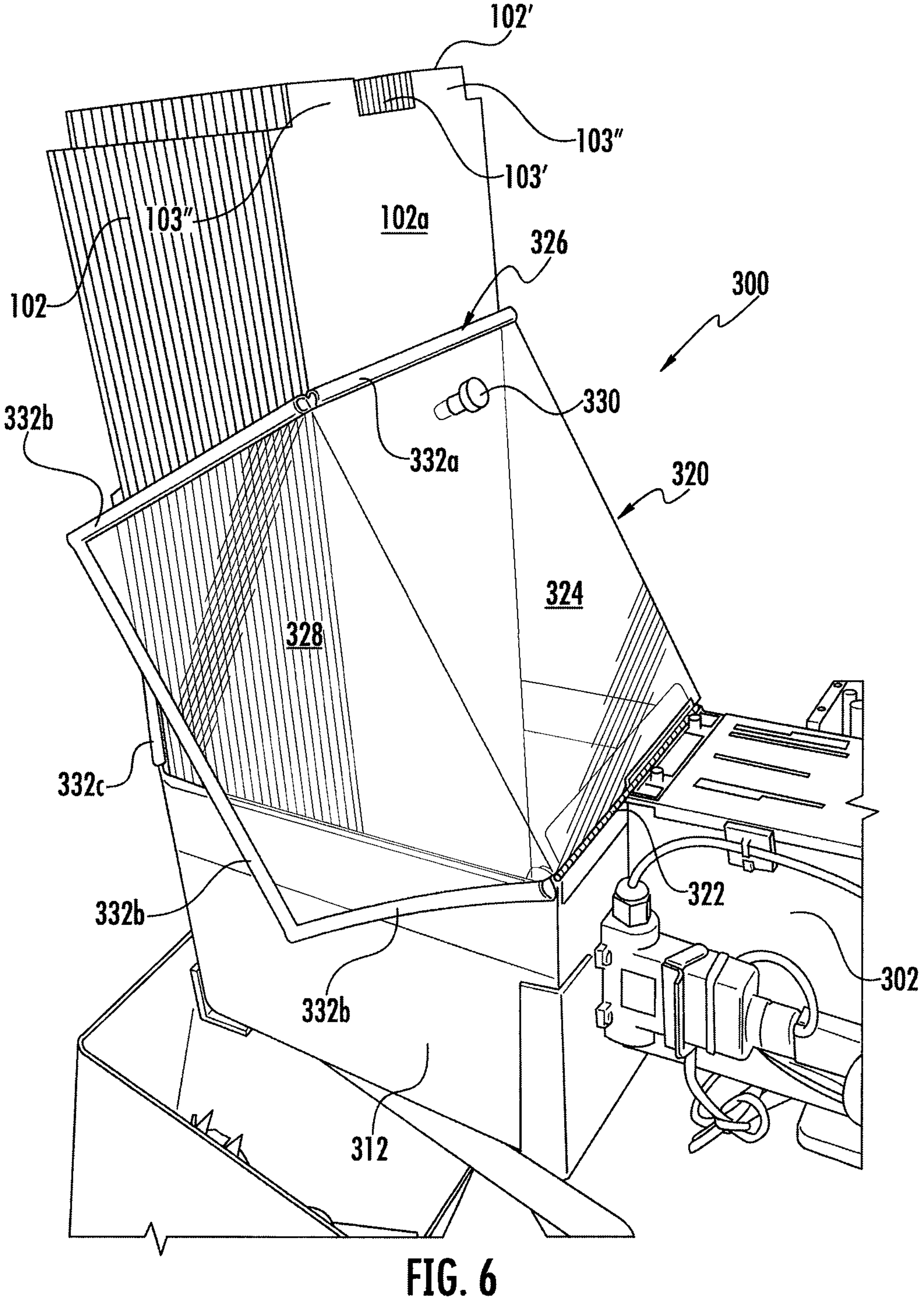
FIG. 6 illustrates a perspective view of the receptacle of FIG. 1 with articles positioned therein according to an example embodiment of the present disclosure.

As illustrated in FIG. 5, the pivotable cover member 320 may further comprise a handle 330 coupled to the upper portion 324 thereof. Thus, whereas FIG. 5 illustrates the pivotable cover member 320 in a closed position, the handle 330 may be employed to facilitate pivoting the pivotable cover member to an open position such that one or more articles 102 may be loaded through the upper opening 304 into the interior compartment 306 of the receptacle 300. In this regard, FIG. 6 illustrates a plurality of articles 102 received in the receptacle 300 and extending from the upper opening 304. As illustrated, the end wall 314 opposite to the end opening 316 supports the articles 102 in the receptacle 300 such that the label application surface 102*a* and the applicator surface 214 of the displaceable piston 206 are substantially parallel with respect to each other. In order to accommodate elongated articles 102, the end wall 314 may extend outwardly of the opening and past the sidewalls 310, 312 such the articles are properly supported thereby (i.e., substantially along the length of the article) and the articles are accessible outside of the receptacle 300 when the pivotable cover member 320 is pivoted toward the end wall.

The distal end 326 of the upper portion 324 of the pivotable cover member 320 may be configured to engage the articles 102 extending from the receptacle 300 through the upper opening 304, so as to urge the articles against the end wall 314 when the pivotable cover member is pivoted toward the end wall. In some embodiments the distal end 326 of the pivotable cover member 320 may be rounded. For example, the pivotable cover member 320 may comprise a U-shaped member 332*a* defining a channel configured to receive the distal end 236 of the pivotable cover member. Various other portions of the receptacle 300 may additionally include U-shaped members. For example, U-shaped members 332*b* may be coupled to the side portions 326, 328 of the pivotable cover member 320 and U-shaped members 332*c* may be coupled to the end wall 314 opposite the end opening 316. The U-shaped members 332*a-c* (collectively, "332") may comprise, for example, a tube with a slit down the length thereof in some embodiments. By providing U-shaped members 332 on these surfaces, the user may be protected from contact with surfaces that might otherwise define sharp edges.

Further, the U-shaped members 332 may provide other functions. In this regard, the U-shaped members 332 may be formed from a low friction material such as metal, plastic or rubber. Accordingly, the articles 102 may easily slide against the U-shaped members, as will be described below. Further, the U-shaped members 332 may cover any sharp edges defined by the receptacle 300, as noted above. Accordingly, the U-shaped members 332 may prevent damage to the articles 102 during operation.

Use of the label applying apparatus 100 will now be discussed. In this regard, the handle 330 may be employed to lift the pivotable cover member 320 from a closed position illustrated in FIG. 5 to an open position. Thereby, the interior compartment 306 may be exposed such that a plurality of articles 102 may be inserted through the upper opening 304 thereof. As illustrated in FIG. 6, the distal end 326 of the upper portion 324 of the pivotable cover member 320 may then engage the articles 102 such that at least the label application surfaces of the respective articles are retained in alignment substantially parallel with the end wall 314 opposite to the end opening 316 and the applicator surface 214 of the displaceable piston 204. In this position the displaceable piston 204 is configured to extend into the interior compartment 306 in an application direction 204' (see, e.g., FIG. 2) and apply a label 104 to the label application surface 102*a* of an outermost one 102' of the articles 102 (or the article in closest proximity to the displaceable piston) from the applicator surface 214.

In some embodiments the label applicator 200 may automatically detect the presence of one or more articles 102 in the receptacle 300 and actuate the displaceable piston 204 to apply a label 104 to the most proximate article 102. In another embodiment the label applicator 200 may further comprise a switch or button 220 (see, e.g., FIG. 3) which a user may actuate when he or she is ready to apply a label 104 to the most proximate article 102. When the button 220 is depressed, the spool 212 may rotate by an increment substantially equal to a length of one of the labels 104 (in addition to any spacing distance between the labels on the backing 108). Thereby, a label 104 may be separated from the backing 108 by the tip 208 of the separator member 206 and directed to the applicator surface 214 of the displaceable piston 204, as discussed above with reference to FIG. 2. The label 104 may be held in place on the applicator surface 214 by vacuum applied thereto by the air connection 216. Accordingly, the displaceable piston 204 may extend into the interior compartment 306 (see, e.g., FIG. 4) and apply a label 104 to an outermost one 102' of the articles 102 from the applicator surface 214, or most proximate article 102 with respect to the displaceable piston 204.

In order to allow for release of the label 104 from the applicator surface 214, in one embodiment the air connection 216 may be configured to apply vacuum to the label 104 that creates a bonding force between the label and the applicator surface that is less than a bonding force between the label and the article 102 created by the adhesive on the label. In another embodiment the label applicator 200 may include a sensor that detects when the applicator surface 214 of the displaceable piston 204 comes into contact with an article 102 with sufficient pressure to adhere the label to the label application surface of the article 102. Accordingly, when the label applicator 200 determines that a label 104 is brought into contact with an article 102, the air connection 216 may be turned off or the vacuum applied to the applicator surface 214 may be decreased such that the label may more easily be released from the applicator surface. Such a sensor may additionally or alternatively be employed to determine how far the displaceable piston 204 should extend into the interior compartment 306 to contact the most proximal article 102 with respect to the displaceable piston 204. In another embodiment the air connection 216 may apply a positive pressure to the applicator surface 214 when contact between the applicator surface and the article 102 is detected. Accordingly, in this embodiment the label 104 may be forced by the pressure at the applicator surface 214 toward the article 102 to encourage bonding therewith.

After a label 104 is applied to the outermost one 102' of the articles 102, the user may remove this label-applied article from the receptacle 300. As the user lifts upwardly on the article 102, the U-shaped member 332*a* at the distal end 326 of the upper portion 324 of the pivotable cover member 320 may engage and press against the article and apply pressure to the label 104 to facilitate adhesion of the label. Accordingly, the U-shaped member 332*a* at the distal end 326 of the upper portion 324 of the pivotable cover member 320 may function to more thoroughly secure the label 104 to the article 102 as the article is lifted from the receptacle 300.

Figure 7:
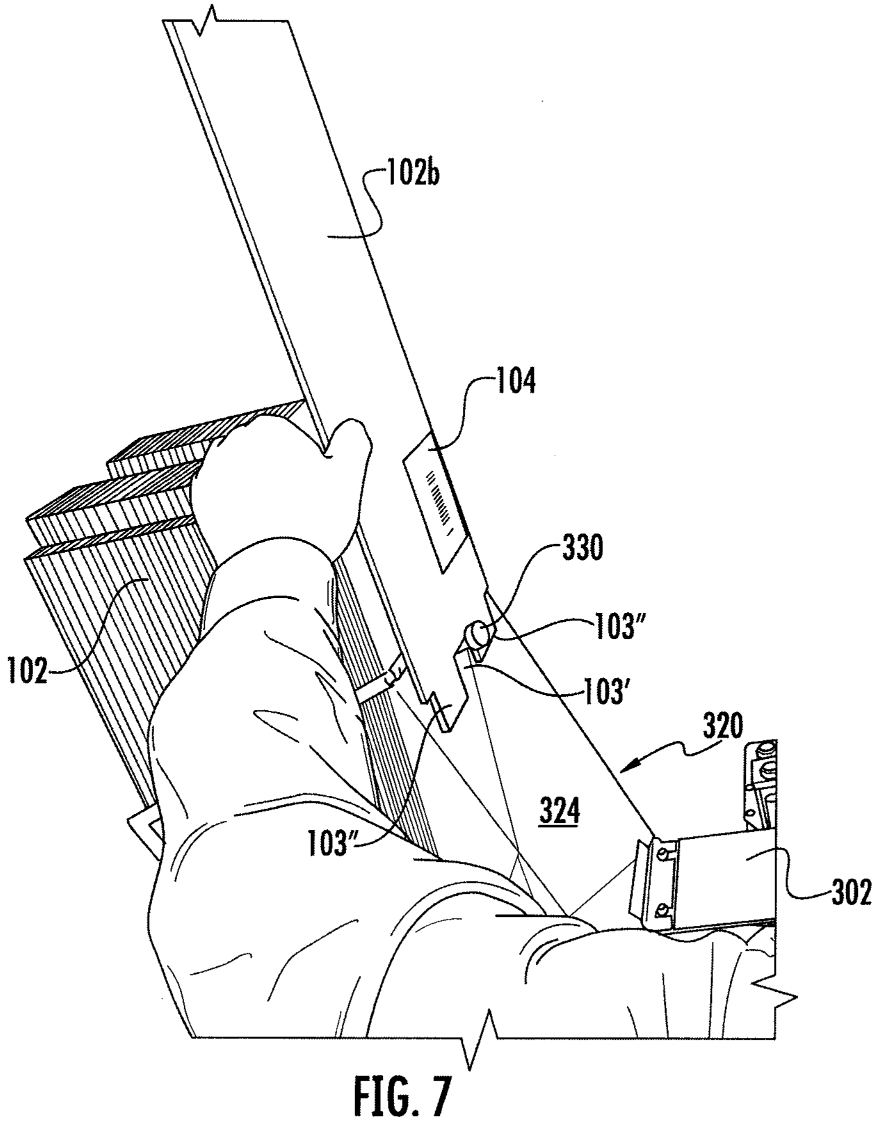
FIG. 7 illustrates a perspective view of the receptacle of FIG. 1 with articles positioned therein and with articles engaging a handle of the pivotable cover member according to an example embodiment of the present disclosure.

After a labeled article 102*b* is removed from the receptacle 300, the user may wish to temporarily hold onto the labeled article while additional articles 102 are labeled. Accordingly, efficiency with respect to labeling the articles 102 may be improved. In order to facilitate this, as illustrated in FIG. 7, the handle 330 may be configured to engage one or more of the labeled articles 102*b*, for example, about a recess 103' defined by each of the articles 102. For example, the articles 102 may include tabs 103" that define the recess 103' therebetween. Accordingly, a user may conveniently accumulate and hold a number of labeled articles 102*b* on the handle 330 before moving the labeled articles to an alternate location or to subsequent processing.

Figure 8:
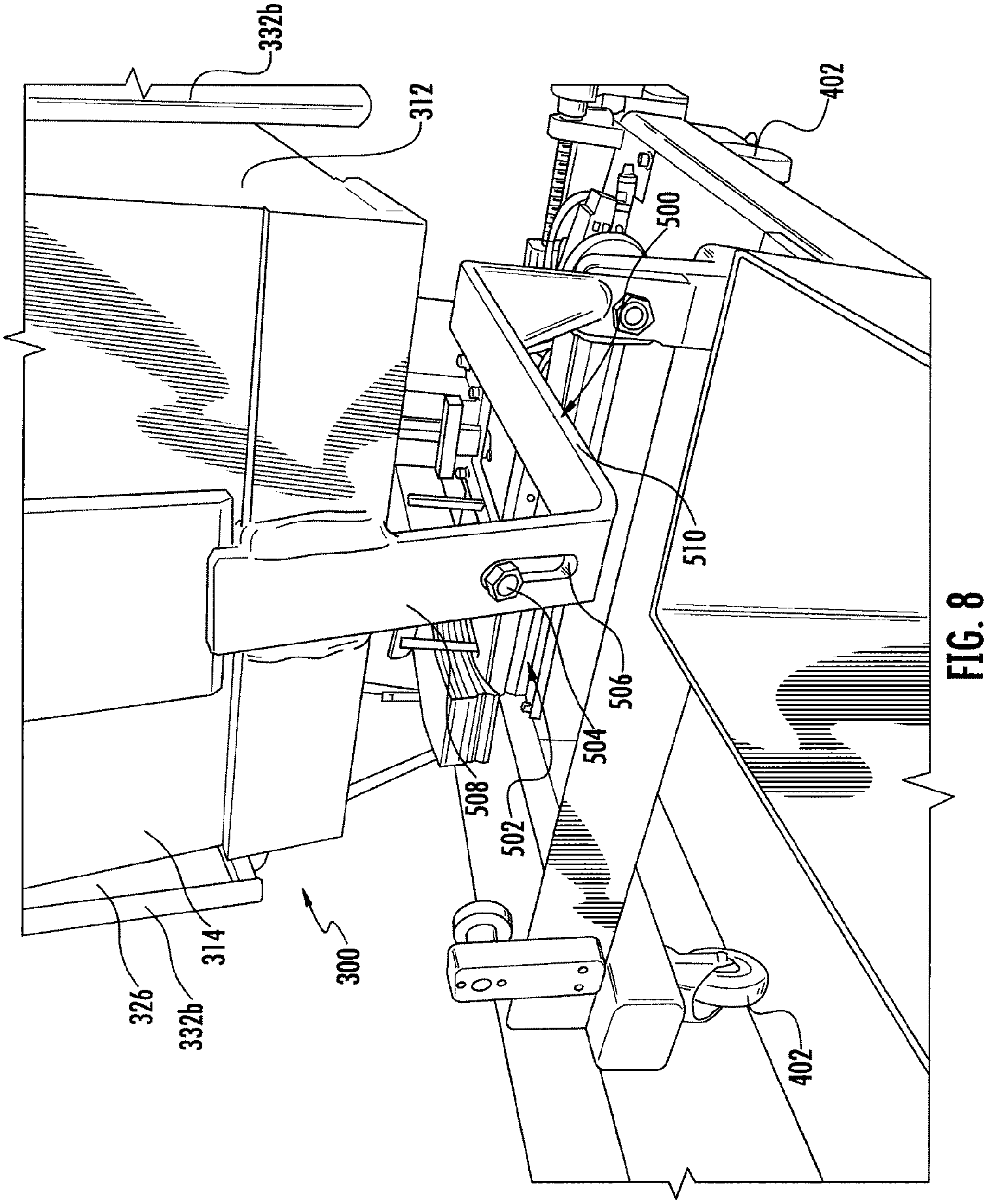
FIG. 8 illustrates a bracket configured to control a position of the receptacle relative to the label applicator of FIG. 1 according to an example embodiment of the present disclosure.

In some embodiments the positioning of the label 104 on the article 102 may be important. For example, the label 104 may later be read by an automated scanner in some embodiments, which may require the label to be positioned at a certain location on the article 102. Accordingly, as illustrated in FIG. 8, the label applying apparatus 100 may further comprise a bracket 500 configured to control a position of the receptacle 300 relative to the displaceable piston 204 (i.e., so as to position the label application surface of the article in a desired lateral position relative to the applicator surface of the displaceable piston). In this regard, the bracket 500 may mount to both the stand 400 and the receptacle 300. In order to provide for adjustment of the position of the receptacle 300, the bracket 500 may comprise an adjustment mechanism 502. The illustrated adjustment mechanism 502 comprises a locking bolt 504 that extends through a slot 506 in one or both of first and second components 508, 510 of the bracket 500 that respectively couple to the receptacle 300 and the stand 400. Since the slot 506 extends vertically, the vertical position of the receptacle 300 may be adjusted such that the height at which the displaceable piston 204 applies the labels 104 to the articles 102 may be controlled. In another embodiment the adjustment mechanism may additionally or alternatively provide horizontal adjustment of the position of the receptacle 300 such that the position along the article 102 at which the label 104 is applied may be controlled. The bracket 500 may also function to control the angle of the receptacle 300 relative to vertical. In this regard, it may be desirable to position the receptacle 300 such that the end wall 314 opposite to the end opening 316 defines an angle with respect to vertical such that gravity may tend to cause the articles 102 to rest against the end wall. Accordingly, the angle of the receptacle 300, as controlled by the bracket 500, may assist the pivotable cover member 320 in retaining the articles 102 against the end wall 314.

Thus, as noted above, a bracket 500 may be employed to control the position of the receptacle 300. In this regard, the end wall 314, the bottom wall and the sidewalls 310, 312 cooperate to support the articles 102 in the receptacle 300. Accordingly, the position of the walls 308, 310, 312, 314 affects the position at which the label 104 is applied on the label application surface 102*a* of the article 102. Thus, one or both of the bottom wall 308 and the sidewalls 310, 312 may be adjustable so as to adjust the selected position on the label application surface 102*a* of the article 102 at which the applicator surface 214 of the displaceable piston 204 applies the label 104. For example, lowering the bottom wall 308 may increase the vertical height on the applicator surface 102*a* at which the label 104 is applied, and conversely raising the bottom wall may decrease the vertical height on the label application surface at which the label is applied. Further, shifting the sidewalls 310, 312 horizontally in one direction will cause the label 104 to be applied farther in the opposite direction on the label application surface 102*a*. Accordingly, the bracket 500 or any other adjustment mechanism may be configured to adjust the position of the bottom wall 308 and/or the sidewalls 310, 312, in order to adjust the selected position at which the label 104 is applied on the label application surface 102*a* of the article. In some instances, in addition to or in the alternative, the bracket 500 may be configured to adjust an angular position at which the label 104 is applied to the label application surface 102*a*, for example, about the axis defined by the application direction of the displaceable piston.

Figure 9:
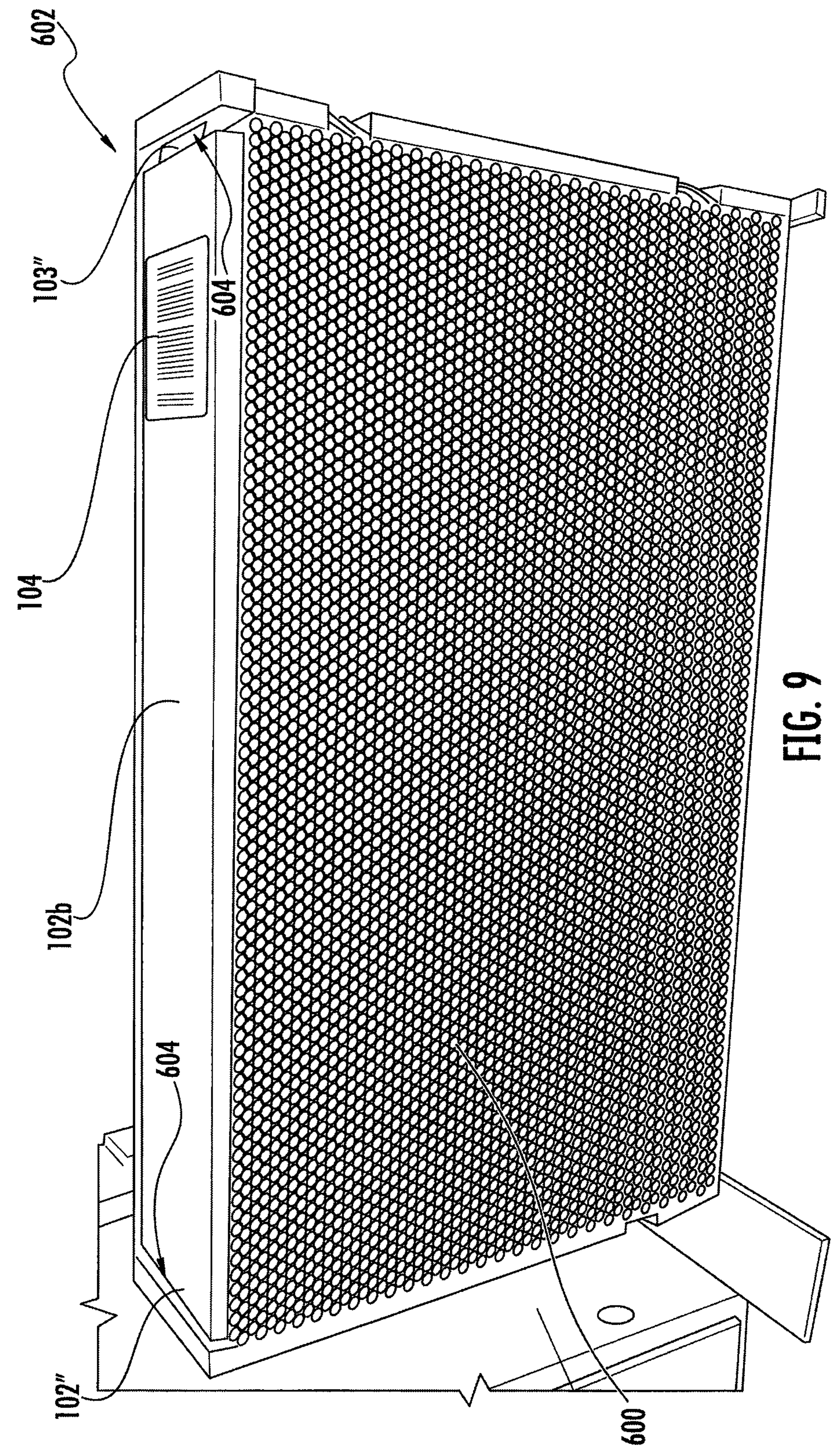
FIG. 9 illustrates a tray with cigarettes held therein by a sword that has been labeled by the label applying apparatus of FIG. 1.

The label applying apparatus 100 may be employed to label a variety of articles 102 for a variety of purposes. However, one embodiment of a use of the labeled articles 102*b* produced by the label applying apparatus 100 is illustrated in FIG. 9. As illustrated, the labeled article 102*b* may be employed as a sidewall or "sword" configured to hold a plurality of cigarettes or cigarette filters 600 in a tray 602. In particular, the labeled article 102*b* may be folded over such that the label 104 is positioned facing outwardly, and the tabs 102" may be tucked into slots 604 defined in the tray 602. Accordingly, the labeled article 102*b* may hold the cigarette filters 600 in the tray 602. Thereafter, the label 104 may be employed to indicate the identity (e.g., batch number) of the cigarette filters 600 when they are inspected or otherwise processed or packaged. However, as noted above, the label applying apparatus 100 may be employed to produce labeled articles 102*b* for a variety of other purposes.

Figure 10:
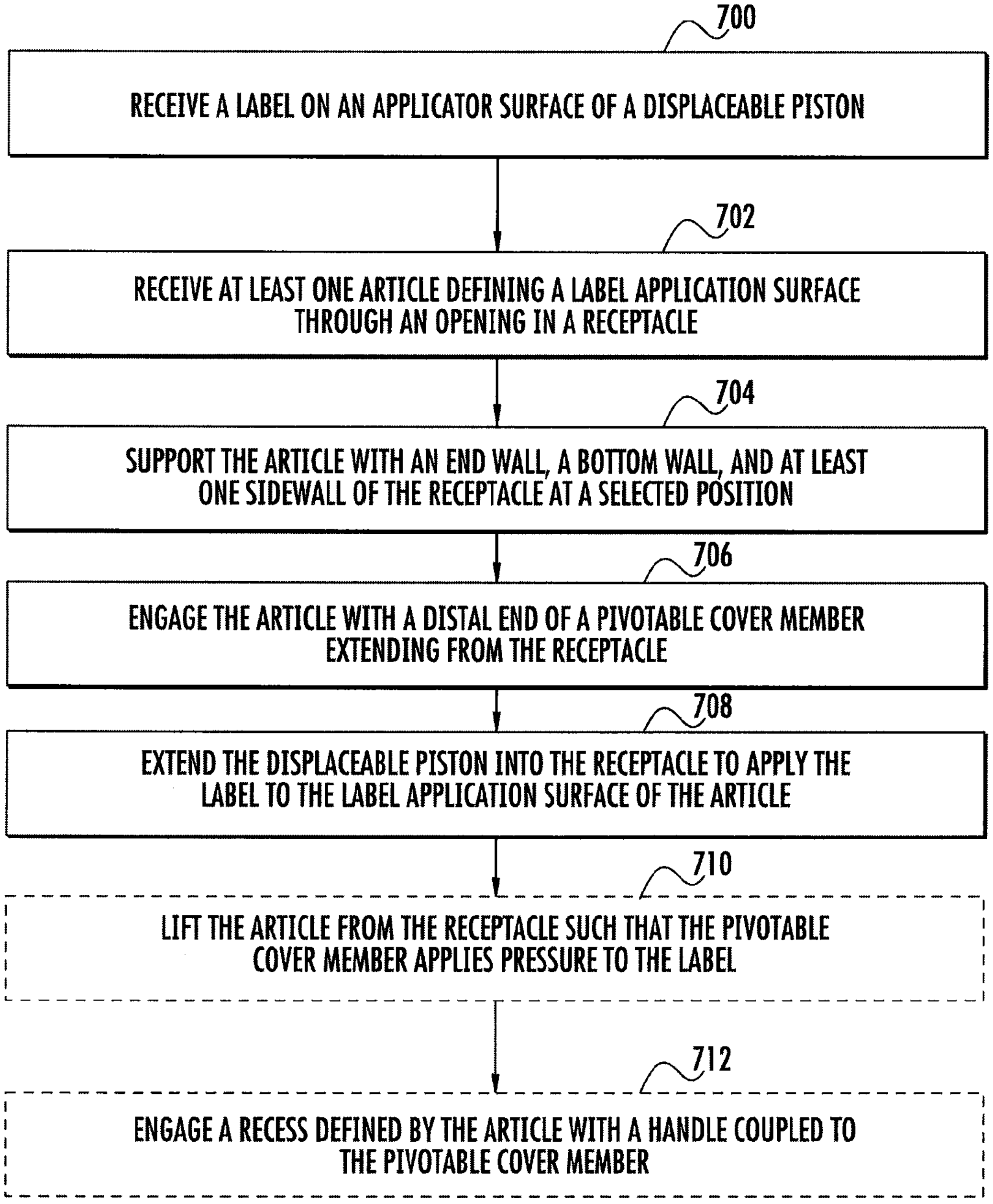
FIG. 10 schematically illustrates a method for labeling according to an example embodiment of the present disclosure.

Embodiments of related methods are also provided. In this regard, FIG. 10 illustrates an example embodiment of a method for labeling. As illustrated, the method may include receiving a label from a substantially continuous supply of labels on an applicator surface of a displaceable piston, the displaceable piston, having the label on the applicator surface thereof, being displaceable in an application direction at operation 700. Further, the method may include receiving at least one article defining a label application surface through an opening in a receptacle, such that the at least one article extends from the opening at operation 702. The method may also include supporting the at least one article with an end wall of the receptacle such that the label application surface thereof is substantially parallel with the applicator surface of the displaceable piston, and supporting the at least one article with a bottom wall of the receptacle, in cooperation with at least one side wall of the receptacle, such that the label application surface of the at least one article is disposed at a selected position (e.g., laterally) with respect to the applicator surface of the displaceable piston at operation 704. Additionally, the method may include engaging the at least one article extending from the receptacle, through the opening, with a distal end of a pivotable cover member opposed to the bottom wall and configured to be pivotable toward and away from the end wall, the distal end of the pivotable cover member being configured to urge the at least one article against the end wall, when the pivotable cover member is pivoted toward the end wall at operation 706. The method may further comprise extending the displaceable piston into the receptacle along the application direction so as to engage the label application surface of the at least one article with the applicator surface of the displaceable piston so as to apply the label to the label application surface of the at least one article at operation 708.

In some embodiments the method may additionally include other optional operations, which are indicated by boxes including dashed lines. In this regard, additional operations may include lifting the at least one article to which the label is applied from the receptacle such that the distal end of the pivotable cover member applies pressure to the label at operation 710. Also, the method may include engaging the at least one article that is removed from the receptacle with a handle coupled to the pivotable cover member, for example, such that one or more labeled articles removed from the receptacle, one or more at a time, can be temporarily supported by an operator on the handle until a particular number of labeled articles is removed by the operator for subsequent handling, at operation 712.

Accordingly, the embodiments of apparatuses and methods disclosed herein may provide advantages over manual application of labels to articles by hand. In this regard, the apparatuses and methods disclosed herein may allow an operator to more rapidly and accurately apply labels to the articles. For example, the user may not have to individually remove labels from the backing and align each label on the particular article for application thereof, but rather these operations may be automated. Further, the receptacle may be configured to store a relatively large number of articles (e.g., up to about 75 or 100 articles), and hence batches of articles may be labeled efficiently. Further, the handle may operate to conveniently store smaller batches of labeled articles prior to moving the labeled articles to another location.

The methods and apparatuses disclosed herein may also provide increased consistency and accuracy of the labeling of the articles. In this regard, the receptacle may be aligned with respect to the label applicator (e.g., via the bracket) such that the labels are repeatedly applied to substantially the same selected position on the label application surface of each of the articles. Accordingly, for example, an automated label reader may more easily be able to read the label. Thus the apparatuses and methods disclosed herein present a number of advantages over manual application of labels by hand.

Many modifications and other embodiments of the disclosure will come to mind to one skilled in the art to which this disclosure pertains having the benefit of the teachings presented in the foregoing description; and it will be apparent to those skilled in the art that variations and modifications of the present disclosure can be made without departing from the scope or spirit of the disclosure. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A receptacle for use in applying labels, the receptacle comprising:

an end wall configured to support at least one article defining a label application surface substantially parallel therewith;

a bottom wall and at least one sidewall configured to cooperate to support the at least one article such that the label application surface thereof is disposed at a selected position, the end wall, the bottom wall and the sidewall each being engaged with one another to collectively define an interior compartment, the sidewall extending upwardly from the bottom wall to define an opening configured to receive the at least one article therethrough such that the at least one article extends from the interior compartment through the opening; and a pivotable cover member opposed to the bottom wall and configured to be pivotable about a hinge positioned opposite from the end wall, the pivotable cover member having a distal end configured to engage the at least one article extending from the receptacle through the opening, so as to urge the at least one article against the end wall, when pivoted toward the end wall, wherein the end wall extends upwardly from the bottom wall past the opening to support the article inside and outside of the interior compartment.

2. The receptacle of claim 1, wherein the distal end of the pivotable cover member is rounded.

3. The receptacle of claim 2, wherein the pivotable cover member comprises a U-shaped member defining a channel configured to receive the distal end of the pivotable cover member.

4. The receptacle of claim 1, wherein the pivotable cover member further comprises a handle configured to facilitate pivoting the pivotable cover member and further configured to engage a recess defined by the at least one article after labeling thereof and removal from the receptacle.

5. The receptacle of claim 1, wherein the at least one sidewall comprises opposing first and second sidewalls.

6. The receptacle of claim 5, wherein the pivotable cover member comprises an upper portion extending from the hinge to the distal end and a pair of opposing side portions coupled to the upper portion and configured to extend proximate the opposing first and second sidewalls.

7. The receptacle of claim 6, wherein the opposing side portions of the pivotable cover member are configured to extend outside of the opposing first and second sidewalls.

8. The receptacle of claim 1, further comprising an end opening positioned opposite to the end wall.

9. The receptacle of claim 8, further comprising a connector section extending from the end opening.

10. A method for labeling, comprising:

receiving a label from a substantially continuous supply of labels on an applicator surface of a displaceable piston, the displaceable piston, having the label on the applicator surface thereof, being displaceable in an application direction;

receiving at least one article defining a label application surface through an opening in a receptacle, such that the at least one article extends from the opening;

supporting the at least one article with an end wall of the receptacle such that the label application surface thereof is substantially parallel with the end wall and the applicator surface of the displaceable piston;

supporting the at least one article with a bottom wall of the receptacle, in cooperation with at least one side wall of the receptacle, such that the label application surface of the at least one article is disposed at a selected position with respect to the applicator surface of the displaceable piston;

engaging the at least one article extending from the receptacle, through the opening, with a distal end of a pivotable cover member opposed to the bottom wall and configured to be pivotable toward and away from the end wall, the distal end of the pivotable cover member being configured to urge the at least one article against the end wall, when the pivotable cover member is pivoted toward the end wall; and extending the displaceable piston into the receptacle along the application direction so as to engage the label application surface of the at least one article with the applicator surface of the displaceable piston so as to apply the label to the label application surface of the at least one article.

11. The method of claim 10, further comprising lifting the at least one article to which the label is applied from the receptacle such that the distal end of the pivotable cover member applies pressure to the label.

12. The method of claim 11, further comprising engaging the at least one article that is removed from the receptacle with a handle coupled to the pivotable cover member.

13. The receptacle of claim 1, wherein the end wall diverges from a vertical plane such that an inner surface of the end wall faces upwardly.

14. The receptacle of claim 5, further comprising a second end wall facing the end wall and engaged with the opposing first and second sidewalls and the bottom wall.

15. The receptacle of claim 14, wherein the second end wall defines an end opening.

16. The receptacle of claim 15, wherein the pivotable cover member is coupled to the second end wall via the hinge.

17. The receptacle of claim 1, wherein the end wall is substantially planar.

* * * * *